United States Patent [19]

Bricmont

[11] 4,257,549
[45] Mar. 24, 1981

[54] METHOD OF MAKING ALUMINUM-BASE METAL CLAD GALVANIZED STEEL LAMINATE

[75] Inventor: Robert J. Bricmont, Allison Park, Pa.

[73] Assignee: H. H. Robertson Company, Pittsburgh, Pa.

[21] Appl. No.: 35,210

[22] Filed: May 2, 1979

Related U.S. Application Data

[60] Division of Ser. No. 886,551, Mar. 14, 1978, abandoned, which is a continuation-in-part of Ser. No. 790,471, Apr. 25, 1977, abandoned.

[51] Int. Cl.³ ............................................. B32B 15/20
[52] U.S. Cl. .............................. 228/235; 228/263 D; 427/406; 427/433; 428/650; 428/659
[58] Field of Search .......... 228/235, 208, 193, 263 D; 428/650, 659; 427/405, 406, 433

[56] References Cited

U.S. PATENT DOCUMENTS

| 547,381 | 10/1895 | McKnight | 204/38 S |
|---|---|---|---|
| 2,301,332 | 11/1942 | Scheller | 228/235 |
| 2,484,118 | 10/1949 | Reynolds | 228/208 |
| 2,490,978 | 12/1949 | Osterheld | 428/650 |
| 2,539,247 | 1/1951 | Hensel | 228/208 |
| 2,631,641 | 3/1953 | Coffman | 427/369 |
| 2,797,460 | 7/1957 | Whitfield | 428/650 |
| 2,849,790 | 9/1958 | Zwicker | 428/650 |
| 3,066,041 | 11/1962 | Busch | 427/405 |
| 3,078,555 | 2/1963 | McFarland | 423/433 |
| 3,078,563 | 2/1963 | Gould et al. | 228/208 |
| 3,438,754 | 4/1969 | Shepard et al. | 428/650 |
| 3,475,141 | 10/1969 | Hubbell et al. | 428/650 |
| 3,615,276 | 10/1971 | Singleton | 428/686 |
| 3,650,710 | 3/1972 | Doucerain | 428/650 |
| 3,652,321 | 3/1972 | Hood | 428/650 |
| 3,788,823 | 1/1974 | Wells | 428/650 |
| 3,912,152 | 10/1975 | Forand | 228/193 |
| 4,046,304 | 9/1977 | Tabata et al. | 228/235 |
| 4,061,801 | 12/1977 | Hamada et al. | 428/653 |

FOREIGN PATENT DOCUMENTS

| 2432426 | 1/1976 | Fed. Rep. of Germany | 428/653 |
|---|---|---|---|
| 1587182 | 3/1970 | France | 228/235 |
| 45-36002 | 1/1966 | Japan | 204/38 S |
| 350469 | 6/1931 | United Kingdom | 204/38 S |
| 540048 | 10/1941 | United Kingdom | 427/406 |
| 545023 | 5/1942 | United Kingdom | 228/208 |
| 604194 | 6/1948 | United Kingdom | 428/650 |

Primary Examiner—Ralph S. Kendall
Attorney, Agent, or Firm—George E. Manias

[57] ABSTRACT

An aluminum-base metal clad galvanized steel laminate is prepared by pressing a foil of aluminum-base metal against a steel sheet which has a molten zinc-rich metal coating adhered to both surfaces. The preformed aluminum-base metal foil is metallurgically bonded to the zinc-rich metal coating by a zinc-aluminum eutectic layer as the zinc-rich coating cools and solidifies. The resulting laminate has an outer aluminum-base metal surface, a zinc-aluminum eutectic layer, an intermediate zinc-rich metallic layer, a zinc-iron intermetallic layer, and a steel core.

5 Claims, 4 Drawing Figures

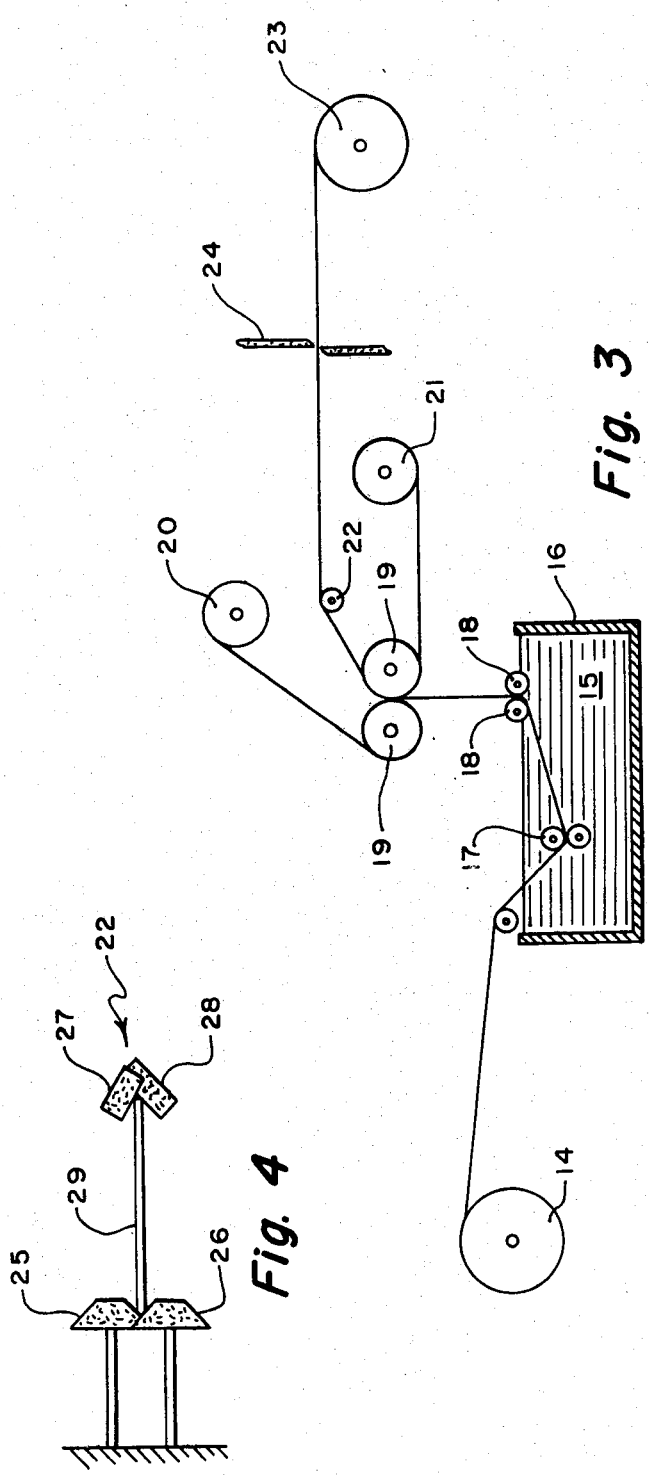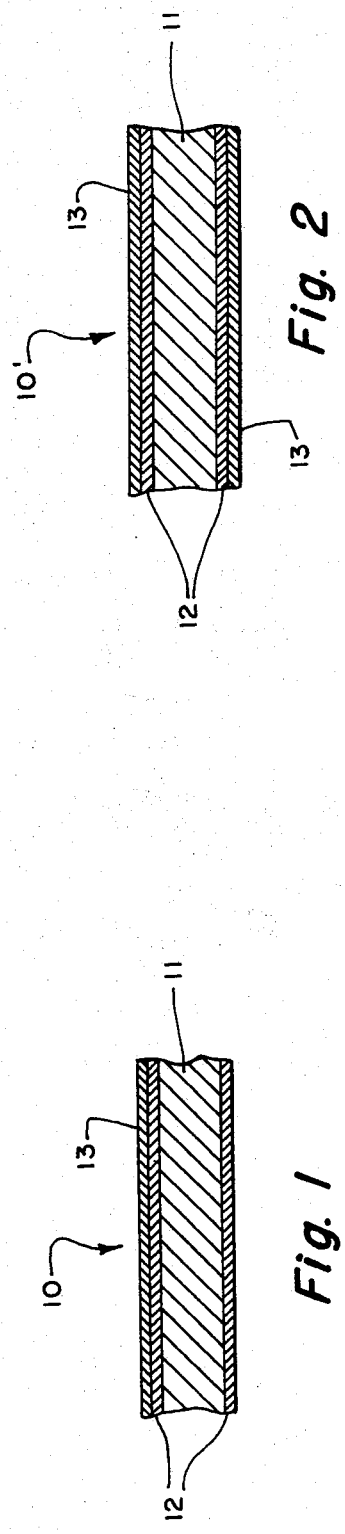

METHOD OF MAKING ALUMINUM-BASE METAL CLAD GALVANIZED STEEL LAMINATE

CROSS-REFERENCES TO RELATED APPLICATIONS

This application is a division of my sopending application Ser. No. 886,551, filed Mar. 14, 1978, abandoned, which is a continuation-in-part of my copending application Ser. No. 790,471 filed Apr. 25, 1977, abandoned.

BACKGROUND OF THE INVENTION

1. Field of the Invention:

The invention concerns a method of making aluminum-base metal clad, zinc-rich metal coated, steel sheet.

2. Description of the Prior Art:

Aluminum coated galvanized steel laminates are described. See U.S. Pat. Nos. 2,490,978 (OSTERHELD), 3,475,141 (HUBBELL et al) and 3,438,754 (SHEPARD et al). OSTERHELD employs a spray coating of zinc on steel and a subsequent spray coating of aluminum on the zinc coating. HUBBELL et al and SHEPARD et al prepare the laminated sheet by vapor deposition of aluminum vapor upon a preformed galvanized steel sheet. Vapor deposition processes are expensive and difficult because of the low pressures required for volatilizing the aluminum vapor. The vapor deposited aluminum and the sprayed aluminum outer coating functions as an envelope over the galvanized steel sheet. Neither forms a zinc-aluminum eutectic bond.

Application of various coatings to molten zinc-rich metal coated steel sheets is known; asbestos fabric, U.S. Pat. No. 2,631,641, COFFMAN; glass fiber fabric, U.S. Pat. No. 3,615,276, SINGLETON.

SUMMARY OF THE INVENTION

Aluminum-base metal foil coated galvanized steel sheets are prepared in a process similar to that described in U.S. Pat. No. 2,631,641 by passing a steel sheet through a molten zinc-rich metal bath and withdrawing the steel sheet while a zinc-rich metal coating remains in a molten condition. While the zinc-rich metal coating is molten, a heated aluminum-base metal foil is pressed against one or both of the flat surfaces of the coated steel sheet. The resulting laminate is passed between a pair of bonding rolls which press the aluminum-base metal foil toward the steel sheet and thereby cause adhesion of the aluminum-base metal foil to the zinc-rich metal layer. The bonding rolls concurrently cool the laminate to a temperature below the solidifying temperature of the zinc-rich metal. The resulting laminate is a useful metal product which may be recoiled, cut into flat sheets or processed immediately by application of additional coatings or by roll forming into profiled shapes.

The laminate has a steel core and a zinc-rich galvanized coating over its entire surface. A zinc-iron intermetallic layer is formed between the steel core and the zinc-rich coating. The aluminum-base metal foil is applied to one or both of the flat surfaces of the galvanized steel sheet. A zinc-aluminum eutectic layer is formed at the interface of the aluminum-base metal foil and the zinc-rich coating.

BRIEF DESCRIPTION OF THE DRAWINGS

FIG. 1 is a cross-section view of the aluminum-base metal foil coated galvanized steel having a single aluminum-base foil coating.

FIG. 2 is a cross-section view, similar to FIG. 1, showing the laminate having two aluminum-base metal foil coatings, one on each side.

FIG. 3 is a diagrammatic view in side elevation of the apparatus for producing protected metal sheets.

FIG. 4 is a detail in front elevation illustrating mechanism for trimming the edge portions of the aluminum-base alloy foil coated sheets.

FIG. 5 is a photomicrograph of a section through a laminate described in the Example.

DESCRIPTION OF THE PREFERRED EMBODIMENT(S)

Definitions

As used in this specification, the term aluminum-base metal identifies substantially pure aluminum and also aluminum alloys wherein the aluminum content exceeds 65 percent by weight.

In the aluminum industry, the term "foil" usually identifies aluminum sheets of 0.5 to 6 mils thickness. The term "sheet" applies to aluminum sheets having greater thickness. For the purpose of the present specification, the term "foil" includes aluminum-base metal in thicknesses from 0.5 to 100 mils.

In general, the present laminate 10 (FIG. 1) or 10' (FIG. 2) includes a steel sheet 11 having a zinc-rich coating 12 adhered to both surfaces and an aluminum-base metal foil 13 adhered to one (FIG. 1) or both (FIG. 2) of the zinc-rich metal coatings 12. A zinc-iron intermetallic layer forms at the interface of the zinc-rich coating 12 and the steel core 11. A zinc-aluminum eutectic layer forms at the interface of the zinc-rich coating 12 and the aluminum-base metal foil 13.

A coil 14 of hot or cold rolled steel strip is supported so that an elongated strip of the steel may be conducted into a galvanizing bath 15 contained within a galvanizing pot 16. The steel strip passes under bottom rolls 17 located below the level of molten zinc-rich metal in the bath 15. The steel strip emerges from the bath 15 and passes upwardly through the nip of a pair of bonding rolls 19. Exit rolls 18 may be employed at the surface of the bath 15.

Aluminum-base metal foil is supplied in coils 20, 21 from which a strip of foil may be trained around the bonding rolls 19 so as to engage the molten zinc surface directly at the nip of the bonding rolls 19. The bonding rolls 19 are preferably from 12 to 36 inches in diameter. In passing through the bonding rolls 19, the zinc-rich metal coating on the steel is squeezed between the steel and the aluminum-base metal foil. The zinc-rich metal cools and solidifies. As the strip emerges from the bonding rolls 19, the aluminum-base metal foil is firmly attached to the steel core. An appropriate edge trimming device 22 may be provided to smooth the side edges of the strip before the strip is recoiled at 23 or cut to selected lengths by means of a suitable shear 24.

The aluminum-base metal foils preferably are preheated by means of suitable heaters 30 to a temperature of 350°-700° F. Excellent bonding and eutectic formation results after the foil is preheated to about 400° F.

The edge trimming device 22 is shown in FIG. 4 including tapered abrasive wheels 25, 26 resiliently mounted for parallel rotation and a pair of cylindrical abrasive cylinders 27, 28 mounted for rotation along skewed axes. The edges of laminate 29 are smoothed during passage through the device 22.

In a preferred embodiment, the bonding rolls 19 are coated with a compressible coating which applies a uniform pressure to the molten zinc coating and minimizes erratic migration of the molten zinc coating between the steel core 11 and the aluminum-base metal foil 13.

The properties of the steel core are as follows:

Hot rolled or cold rolled steel from about 30 gauge to about 12 gauge. Widths from about 6 to 72 inches.

The properties of the zinc-rich molten coating in the bath 15 are as follows:

Essentially pure zinc with minor quantities of other metals, such as lead, aluminum, tin, antimony, cadmium.

The properties of the aluminum-base alloy foil are as follows:

Any wrought aluminum-base metal foil having thickness from about ½ to 100 mils and containing at least 65 percent by weight of aluminum.

The zinc-rich metal bath 15 is maintained at a temperature of about 850° F. If desired, the bonding rolls 19 may be maintained at a temperature below the solidifying temperature of the zinc-rich metal, preferably at a temperature of about 200° F.

The Interface Metallurgy

A zinc-iron intermetallic layer is formed in hot-dip galvanized steel between the zinc-rich coating and the steel core. Such zinc-iron compositions may include a gamma alloy, a delta alloy and a zeta alloy. The gamma alloy is an intermetallic compound having a nominal composition of 75% zinc-25% iron. This compound has its own identifiable crystalline structure and physical properties which are quite different from the iron and from the zinc from which it is formed. The gamma alloy customarily appears as a thin coating parallel to the steel surface. The delta alloy has a nominal composition of 90% zinc-10% iron. The delta alloy is usually adjacent to the steel or adjacent to a gamma layer. The zeta alloy has a nominal composition of 94% zinc-6% iron. The zeta alloy customarily comprises more than half and sometimes as much as 90% of the zinc-iron alloy structure in a galvanized coating on a steel core. Each of the zinc-iron alloy compounds has a melting point which is considerably greater than the galvanizing temperature.

The intermetallic compounds possess properties which are unique when compared to the properties of the metals (iron and zinc) from which they are formed.

Zinc and aluminum do not form intermetallic compounds. However, zinc and aluminum will establish a eutectic alloy. A eutectic alloy is a metallurgical structure which is formed by cooling a molten solution which solidifies as two or more intimately mixed solids when cooled. The zinc-aluminum eutectic composition contains approximately 96% zinc and the balance aluminum. The zinc-aluminum eutectic composition possesses ductility and hence the resulting laminate possesses good ductility. The zinc-aluminum eutectic composition achieves an excellent bond between the aluminum base alloy and the galvanized coating without objectionable embrittling.

The resulting laminated sheet possesses good formability and good corrosion resistance in many environments. The laminated product can be coated with various paint finishes, hot-melt resin coatings, asphaltic coatings. If desired, the aluminum-base metal foil itself may constitute the final outer coat of the product.

The use of preformed aluminum-base metal foil guarantees a uniformity of aluminum-base metal coating to the resulting product, a uniformity which is not achieved in the present processes for producing aluminum clad steel (so-called aluminized steel). The process also can produce aluminum-coated steel having thicker aluminum coatings than those which can be achieved in hot-dip aluminum-cladding processes.

EXAMPLE

A strip of cold-rolled steel, 22 gauge thickness, was fed at a rate of 88 feet per minute into a pot of molten zinc maintained at 850° F. The steel strip was 36 inches wide. The resulting zinc-coated steel issuing from the zinc pot was introduced into the nip of two steel bonding rolls, each 20 inches in diameter. Two sheets of asbestos felt were introduced into the nip of the bonding rolls between the bonding roll surface and the zinc-coated steel. The processing apparatus was substantially that illustrated in U.S. Pat. No. 2,631,641.

An aluminum-base metal foil, 2 mils thick, was introduced into the nip of the rolls between one asbestos felt sheet and the zinc-coated steel strip. A second aluminum-base metal foil, 1 mil thick, was introduced into the nip of the rolls between the other asbestos felt sheet and the zinc-coated steel strip. Both aluminum-base metal foils are believed to be "pure aluminum", i.e., greater than 98.5 weight percent aluminum.

Both aluminum-base metal foils were preheated by the preheaters. An initial setting of the gas-fired preheaters developed a temperature of about 800° F. in the 2 mil foil. The gas feed to the preheaters was reduced and the 2 mil foil temperature reduced to 400° F. A further reduction in gas feed to the preheaters reduced the 2 mil foil temperature to 250° F. The temperature of the bottom foil was not measured.

Bonding roll pressure was maintained at 1000 psi throughout the test. The bottom foil was broken along with the bottom asbestos felt sheet about 45 seconds after the test began. Thus the test yielded about 66 lineal feet of laminate, coated on both sides with the aluminum-base foil as illustrated in FIG. 2. The test also yielded about 280 lineal feet of laminate coated on one side with the aluminum-base foil as shown in FIG. 1.

The resulting laminate was analyzed for its metallurgical properties. A photomicrograph, FIG. 5, shows the presence of the following identifiable layers:

Steel—
Layer 1—Zinc-iron alloy
Layer 2—Zinc
Layer 3—Zinc aluminum eutectic
Layer 4—Aluminum A sample of the laminate of this test was roll formed into an acceptable corrugated roofing sheet. The laminated sheet readily accepted outer paint coatings and hot-melt resin coatings.

The asbestos felt sheets functioned as a compressible coating on the bonding rolls in contact with the aluminum-base metal foil.

I claim:

1. A method of producing an aluminum-base metal coated galvanized steel sheet comprising:
   (a) applying a molten coating of zinc-rich metal to a rolled strip steel sheet to form a zinc-iron intermetallic alloy layer between the said steel sheet and the said molten coating;

(b) while the said zinc-rich metal coating remains molten, applying a preformed foil of aluminum-base metal containing at least 65% by weight aluminum over at least one entire surface of the coated steel sheet;

(c) coincidently pressing the said foil toward the said steel sheet and chilling the said zinc-rich metal coating; and (d) recovering a laminated steel sheet consisting of the said steel core; a zinc-rich metal coating over both surfaces of the said steel sheet; a zinc-iron intermetallic alloy layer between the said steel sheet and the said zinc-rich metal coating; and the said foil of aluminum-base metal being metallurgically adhered to at least one zinc-rich metal surface by means of a zinc-aluminum eutectic composition.

2. The method of claim 1 wherein the said coated steel sheet and the said preformed foil of aluminum-base metal are pressed by passing between the nip of a pair of bonding rolls.

3. The method of claim 2 wherein the said bonding rolls have a compressible coating on the surface.

4. The method of claim 1 wherein said steel sheet passes through a molten bath of said zinc-rich metal to receive the said molten coating and wherein the said steel sheet is withdrawn from the said molten bath prior to application of the said preformed foil of aluminum-base metal.

5. The method of claim 1 wherein the said laminated steel sheet is recovered as a coil.

* * * * *